United States Patent [19]
Montacie

[11] 3,809,432
[45] May 7, 1974

[54] ROTARY TOOL HEAD FOR A CONTINUOUS BORING MACHINE

[75] Inventor: Marcel Montacie, Paris, France

[73] Assignee: Union Industrielle Blanzy-Ouest, Paris, France

[22] Filed: May 17, 1972

[21] Appl. No.: 254,123

[30] Foreign Application Priority Data
May 17, 1971 France .............................. 71.17770

[52] U.S. Cl. .................................... 299/85, 299/80
[51] Int. Cl. ............................................ E21c 37/26
[58] Field of Search ........... 299/80, 85, 86; 175/202

[56] References Cited
UNITED STATES PATENTS
3,290,097  12/1966  Hlinsky et al. ....................... 299/80
2,750,176   6/1956  Cartlidge ............................. 299/80
2,776,124   1/1957  Smith .................................. 299/80

*Primary Examiner*—Ernest R. Purser
*Attorney, Agent, or Firm*—Sughrue, Rothwell, Mion, Zinn & Macpeak

[57] ABSTRACT

Tool for a rotating head of a continuous drilling or cutting machine, mounted on a tool-carrier fixed on the said rotating head, driven in a rotating sweeping movement in a plane passing through the axis of rotation of the said rotating head, by the action of hydro-mechanical means driving a rotating rod coaxial with the said axis in a reciprocating movement; a knuckle joint with an eccentric axis arranged between the rod and the tool-carrier ensures that the linear movement of said rod is converted into a rotating movement of said tool-bearer.

2 Claims, 3 Drawing Figures

ROTARY TOOL HEAD FOR A CONTINUOUS BORING MACHINE

BACKGROUND OF THE INVENTION

1. Field of the Invention

The present invention relates to a device enabling the improved driving of the tool-carriers of a rotating head of a boring or cutting machine in a mechanically synchronized sweeping movement.

2. Description of the Prior Art

Indeed, the use, for driving tool-carriers in an oscillating movement, of hydromechanical means arranged at the axis of rotation of the rotating head, and more particularly of a double-acting jack cylinder controlling the reciprocating movement of a rack meshing with pinions fixed on the tool-carrier to be driven, is known.

However, it happens that this solution must be rejected in the case of application to the boring of holes having a great diameter in hard ground, because of the efforts to be transmitted.

SUMMARY OF THE INVENTION

In order to be able to benefit by that simple collective and synchronous type of driving of the tool-carriers of a rotating head, while bearing the transmission of the effort to the tool-carriers, the present invention proposes to use a knuckle joint with an eccentric shaft for converting the linear movement produced by the double-acting jack cylinder on a rod arranged in the axis of rotation of the rotating head into an oscillating rotating movement of the opposite end of the tool-carrier mounted on the head to the tool.

The present invention has for its object a tool for a rotating head of a continuous boring or cutting machine, mounted on a tool-carrier fixed on the rotating head and driven with a rotating sweeping movement in a plane passing through the axis of rotation of the rotating head by the action of hydromechanical means driving a rotating rod coaxial with said axis in a reciprocating movement, characterized in that means are arranged between the rod and each of the tool-carriers for which they provide appropriate driving in an oscillating movement.

The following description referring to the accompanying drawings and given by way of a non-limiting example, will make it easier to understand the other aims, advantages and means of embodiment of the present invention, it being understood that the particularities disclosed both by the drawing and by the text are a part of the invention.

DESCRIPTION OF THE PREFERRED EMBODIMENT

Figure 1:
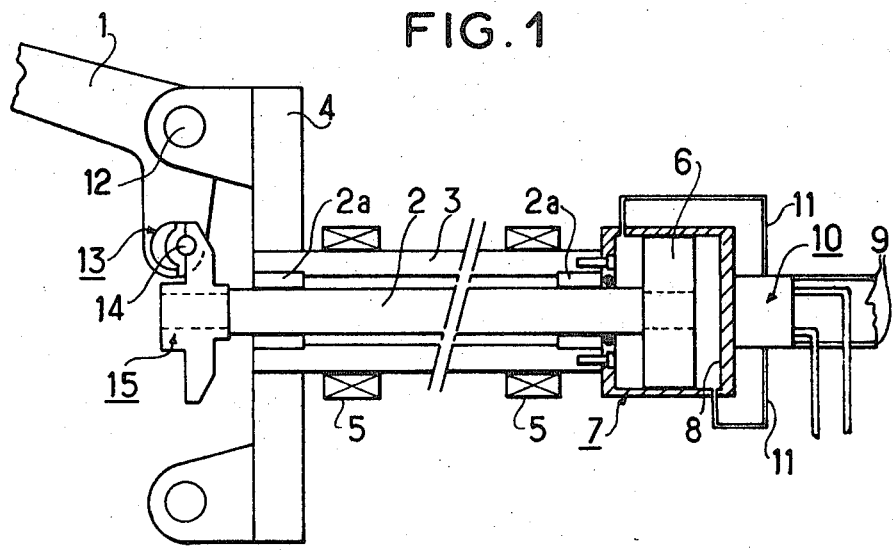
FIG. 1 is a general view of a longitudinal projection of a tool-carrier mounted on the rotating head of a boring machine.

In FIG. 1, the oscillating arms 1, on the end of each of which a tool (not shown) is or are mounted on a tool holder (also not shown) are driven by a central rod 2 sliding on bushings 2a inside the hollow shaft 3 of a rotary head 4 rotating between bushings 5. Rod 2 bears the piston 6 of the double acting jack 7 whose cylinder 8 is supplied with oil under pressure through the fixed tubes 9 across the rotating connection 10, connected to the rotating tubes 11 and corresponding thereto.

The arm 1 is mounted on the shaft 12 fixed on a part 19 borne by the rotating head 4, and its connection with rod 2 is effected by a knuckle joint 13 having an eccentric axis 14 borne by the part 15 fixed to the opposite end of rod 2 to the jack 7.

Figure 2:
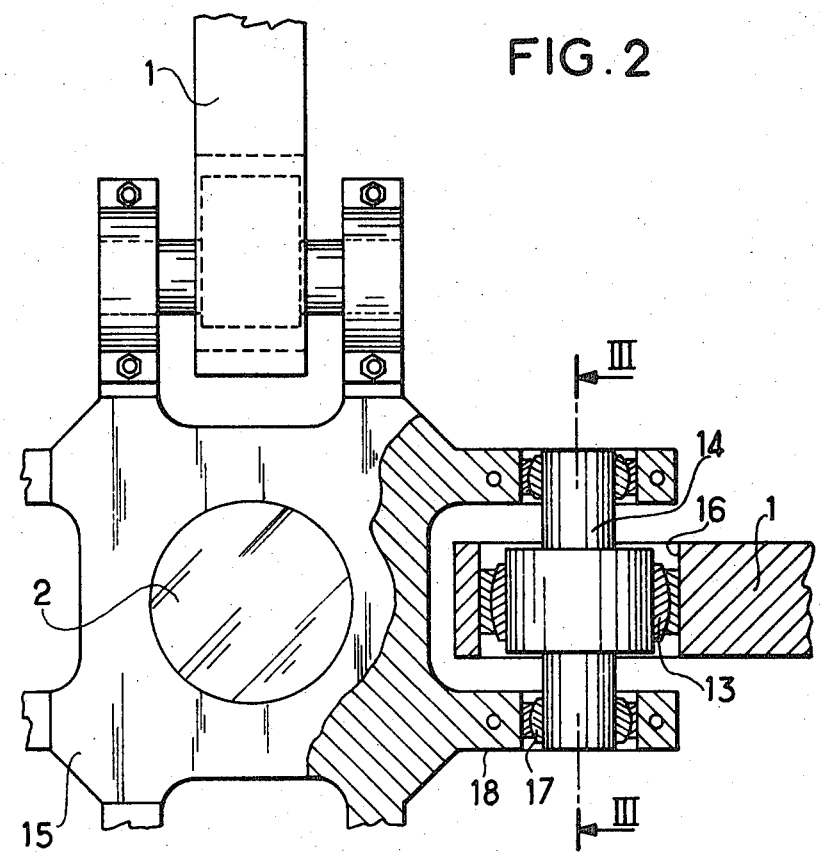
FIG. 2 is a partly cut-away front view of the part for driving the tools of the rotating head of FIG. 1 in an oscillating movement.

In FIG. 2, the large-diameter spherical knuckle joint 13 through which passes the shaft 14, rotating in knuckle type bushings 17 borne by mounting brackets 18 fixed to the part 15, is placed in the recess 16 of the end of the arm 1.

Figure 3:
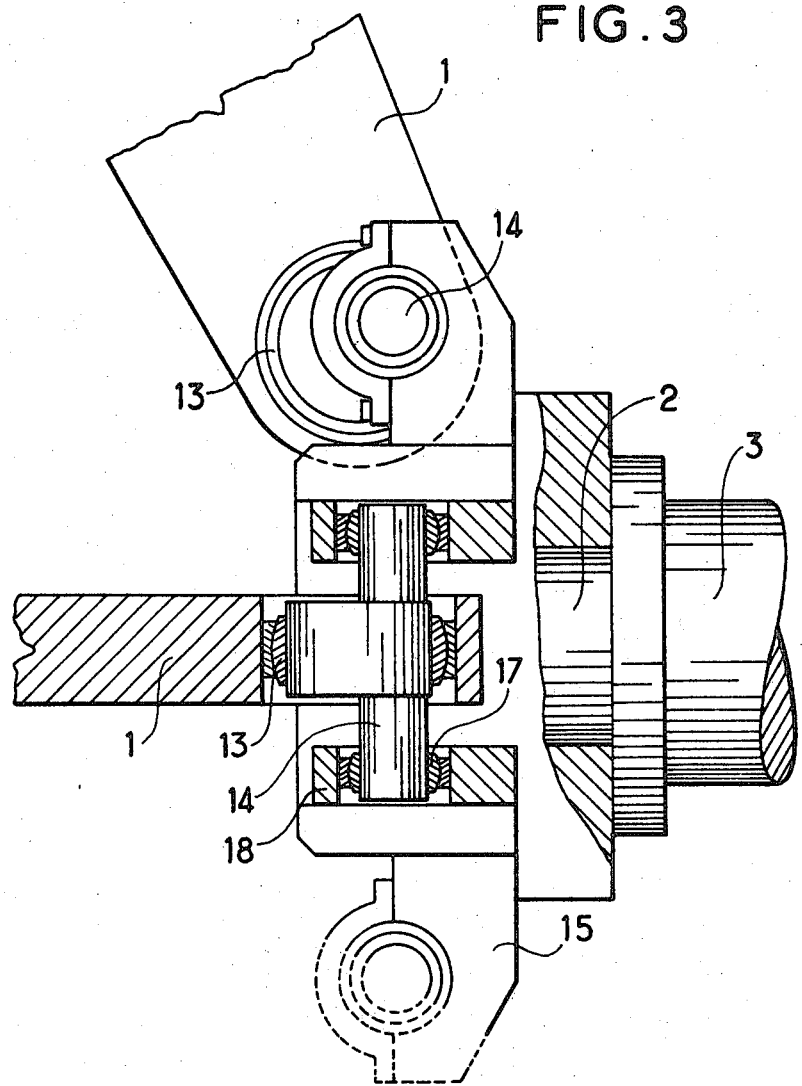
FIG. 3 is a view parallel to the shaft of the rotating head, which is partly cut away along line III—III in FIG. 2.

In FIG. 3, the degree of eccentricity of the knuckle joint 13 in relation to the bearing shaft 14 is brought out. This eccentricity enables the converting of the rectilinear reciprocating movement of the rod 2 into an oscillating rotating movement of the end of the arm in relation to the shaft.

The rotating sweeping movement of the arm in a plane passing through the axis of the hollow shaft 3 of the rotating head is then obtained by a rotating shift of small amplitude of the axis of the knuckle joint 13 in relation to an average position.

It is self-evident that any variation of the present embodiment of the invention corresponding to the general definition thereof which has been given is included in the scope of the protection applied for.

Moreover, all the improvements and advantages of the devices known up till now may be used in connection with the means used in the present invention, more particularly the discontinuous advancing at each reversal of the oscillating movement of the tool-carriers, enabling the power consumed by the work of the tools to be made regular.

Moreover, due to the strength of the hydromechanical driving of the tool-carriers in an oscillating movement, each of them can be equipped with two tools instead of one, said two tools being at a determined distance so as to assign to each of them half of the section of the work face which would be assigned to a single tool-carrier whereas said two tools, thus used, oscillate constantly at the same distance from their axis of oscillation according to the principle of full time use of the machine: the cutting edge of the tool being perpendicular to the work face enables the tool to work in both directions of the oscillating movement of the tool-carrier.

I claim:

1. A continuous boring or cutting machine comprising
   1. a head rotatable about a central axis thereof;
   2. an oscillating arm adapted to mount at least one tool at one end thereof, said arm being pivotably mounted on said head
      a. at a first point on said arm and
      b. at a point on said head spaced from the central axis thereof;
   3. a rod slidably mounted inside said head, said rod being slidable along an axis thereof which is coincident with the central axis of said head;

4. means connecting said rod to said oscillating arm at a second point thereon spaced from said first point thereon, said means comprising:
   a. a pair of spaced mounting brackets fixed to the end of said rod nearer to the material being bored or cut when the machine is in operation,
   b. a shaft mounted for rotation in said pair of spaced mounting brackets and extending therebetween, said shaft lying in a plane perpendicular to the axis of said rod and being perpendicular to a line drawn radially from the axis of said rod; and
   c. knuckle-type bushings mounted for rotation about said shaft and placed in a recess in said oscillating arm, whereby said shaft serves as the eccentric axis of a knuckle joint permitting lost motion to compensate for the difference between the linear motion of said rod and the circular motion of said oscillating arm;

5. means for rotating said head about the central axis thereof while the machine is in operation; and
6. means for reciprocating said rod within said head along the axis thereof while the machine is in operation, whereby a tool mounted on said oscillating arm as above recited will be simultaneously driven in a circular motion in a plane perpendicular to the central axis of said head and in a sweeping motion in a plane including the central axis of said head and rotating therewith.

2. A continuous boring or cutting machine as claimed in claim 1 wherein the end of said oscillating arm adapted to mount at least one tool and the second point on said oscillating arm are on opposite sides of the pivot by which said oscillating arm is pivotably mounted on said head.

* * * * *